5994X
NO PRINTED SPECIFICATION AVAILABLE
H. AIKEN.
Cloth Brushes.
Patented May 24, 1830.
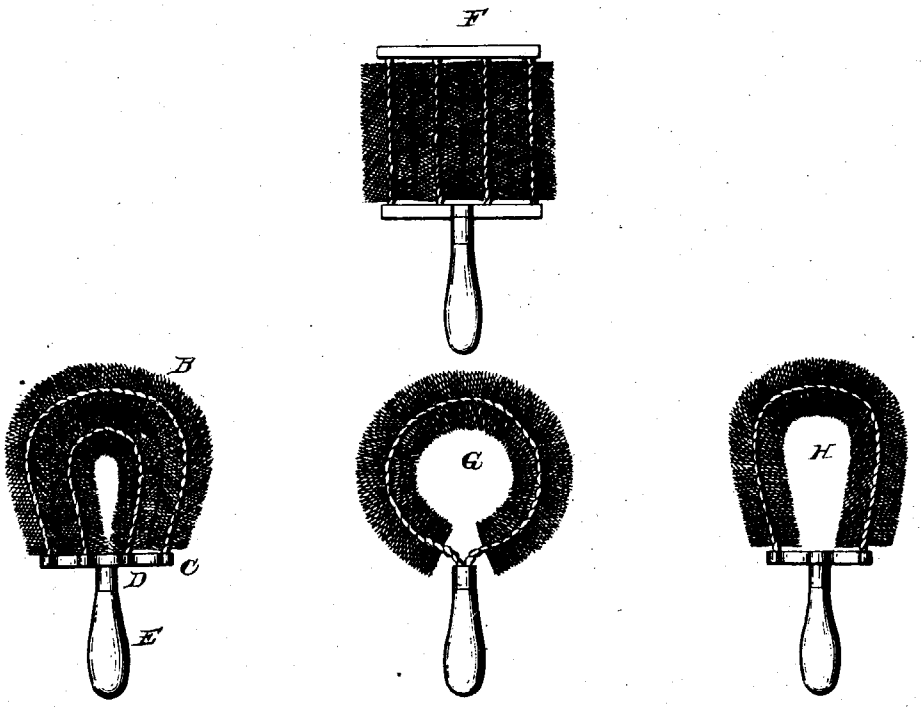

Herrick Aiken
Letters Patent.

The Schedule referred to in these Letters Patent and making part of the same, containing a description in the words of the said Herrick Aiken, himself, of his improvement in Cloth and hair Brushes.

The Bristles or hair is twisted between wires, making a spiral brush, and trimmed to a suitable length. The spiral Brush is then bent into any required shape: and the two ends of the wire, are brought together, and put into a handle, and there secured. Or the two ends of the two ends, of the wire may be rivitted into an iron bar, which has a shank, that enters into, and is fastened into the handle. Another method, is by taking 4 or 6 spiral Brushes, placed parallel, at a suitable distance apart. The ends are then rivitted into iron bars, one at each end: one of the bars has a shank which is fastened into the handle, as before mentioned.

What I claim as my invention is the construction of the above described Brushes for clothes and hair: but I do not claim the principle of twisting hair, or bristles between wires for making Brushes: this having been done before. For a farther illustration of my invention, I refer to the model and drawing of the same, deposited in the Patent Office. In testimony that the above is a true specification of my invention, I have subscribed my name, before two witnesses, and made oath to the same, at the City of Washington this 13th day of May, 1830.

Witnesses
William P. Elliot
Robt W. Fenwick

Herrick Aiken

Eryd.
W.P.G.

(870 words)

(Patented May 24, 1830)